ALBAN G. THOMAS, OF SANDY SPRING, MARYLAND.

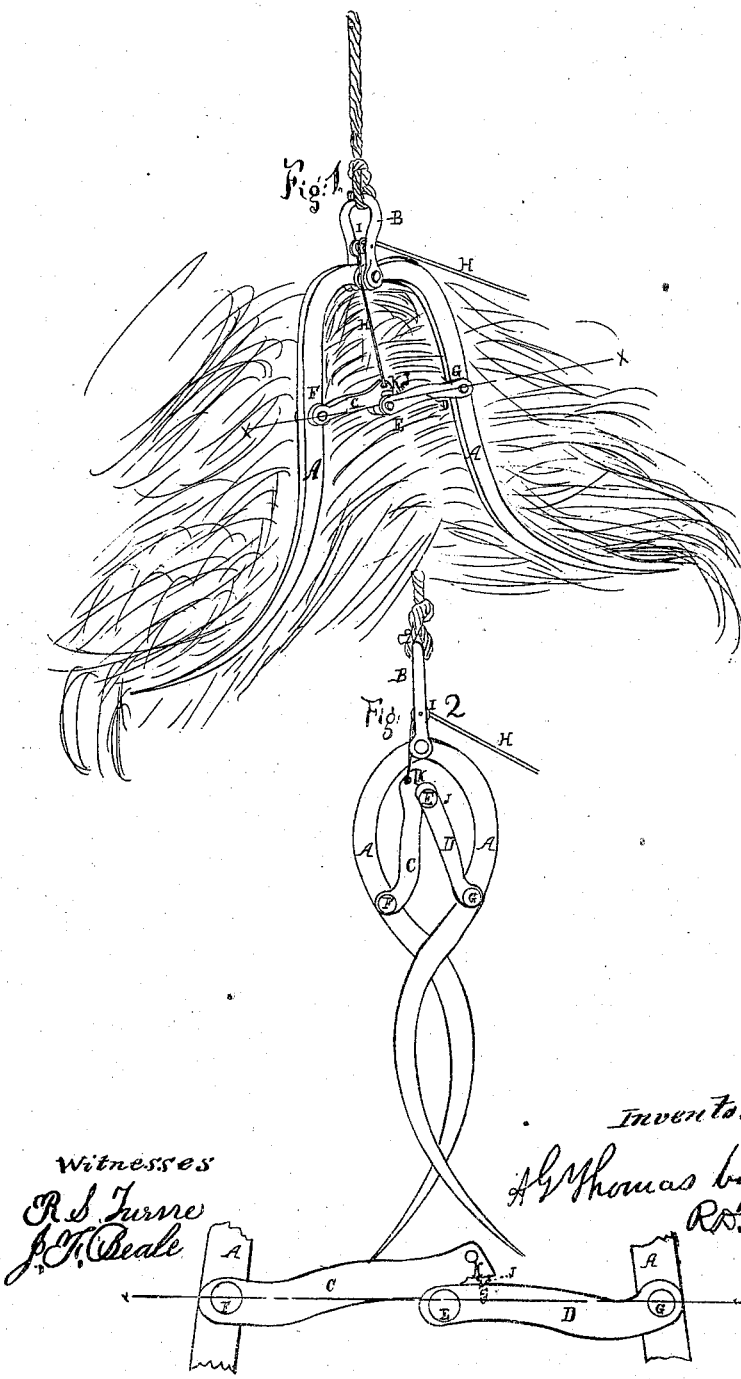

Letters Patent No. 88,754, dated April 6, 1869.

IMPROVEMENT IN HORSE HAY-FORKS.

The Schedule referred to in these Letters Patent and making part of the same.

*To all whom it may concern:*

Be it known that I, ALBAN G. THOMAS, of Sandy Spring, in the county of Montgomery, and State of Maryland, have invented a new and useful Improvement in Horse Hay-Forks; and I do hereby declare the following to be a full, clear, and exact description of the same, reference being had to the accompanying drawings, in which—

Figure 1 shows the fork, in perspective, in operative condition.

Figure 2 is an elevation of the same, closed.

Figure 3 shows the toggle-braces in working position.

The great desideratum in apparatus for agricultural operations is simplicity and durability of construction. The persons who have the care and supervision of these machines are usually unskilled in mechanics, and it is frequently difficult to obtain skilled service in making repairs when needed. The delays incident to the failure of an agricultural machine frequently cause great damage; and, in proportion to its first cost, there is no agricultural apparatus which is capable of inflicting so much damage by an accidental disarrangement as the hay-fork. This is most needed when time is most pressing, and when its refusal to operate may cause damage or ruin to large quantities of hay.

The fork which I have invented contains the fewest possible parts, arranged in the simplest and most effective manner.

That others may understand its construction and operation, I will particularly describe it.

The tines, or legs A are formed as shown, having a *cyma-inversa* curve, and are joined at their upper ends by a hinge, or joint-bolt, which passes through both legs and the ends of the clevis B.

The fork is suspended by means of the clevis B, to which is attached the rope, or tackle by which the fork and its load are to be elevated.

When the fork is to be inserted in the mass of hay which it is required to raise, the tines are brought together, as shown in fig. 2, and as they are inserted and pressed down into the hay, they open and expand to the position shown in fig. 1.

When fully expanded, they are retained in that position by the toggle-braces C D, which are jointed to each other and to the legs A, about one-third of the distance from the upper to the lower ends of said legs.

The centre-joint E of the toggle-braces C D ascends when the legs A are closed nearly to the clevis B, and when the legs, or tines A are opened, said joint E descends a little below a line, *x–x*, which would connect the joints F G, and is prevented from passing more than a very short distance below said line, by some suitable stop, applied for that purpose.

While in this last-described position, the pressure upon the legs A, tending to close them, will also tend to still further depress the joint E, so that the legs A cannot help remaining distended until some power is applied to overcome the pressure downward upon said joint, and to carry it upward across the line which joins the joints F G, so that the continued pressure upon the tines, or legs A will then cause said legs to collapse and close together, and thus permit the hay to slide off.

This power is, in this case, preferably applied by means of a small cord H, which is attached to one of the toggle-braces, and thence passes upward through the clevis and downward to the hand of the attendant.

In order to facilitate the passage of the cord H through the clevis, a small roller, I, may be inserted therein.

The stop-screw J is inserted in brace D in such a position that the lip K, upon the brace C, will strike upon it, and thus limit and regulate the movement of said braces.

By these means it is easy to regulate the amount of power necessary to apply to the tripping-rope H, in order to release the hay from the tines, because, as is well known, when the centre-joint E of a toggle is very near to a straight line, connecting the end-bearings of the same, a movement of said centre-joint toward and across said line will be in a line perpendicular to the line first mentioned, and the change of linear distance between the end-bearings will be so slight that, practically, the power necessary to move the centre-joint across the line first mentioned will only be sufficient to overcome the friction of the centre-joint E.

The weight of the braces C D will be sufficient to cause them to fall into place as the legs A are distended, and, as above mentioned, the stop J may be adjusted so that the centre-joint E will be arrested at a point as near the line connecting the centre-bearing as may be desired.

Having described my invention,

What I claim as new, is—

1. The combination of the tines A A and toggle-braces C D, when constructed, arranged, and operating substantially as shown and described.

2. In combination with the tines A A and toggle-braces C D, the adjustable stop J and lip K, as shown and described.

Witnesses:         ALBAN G. THOMAS.
  A. GILPIN,
  S. BOND.